United States Patent Office.

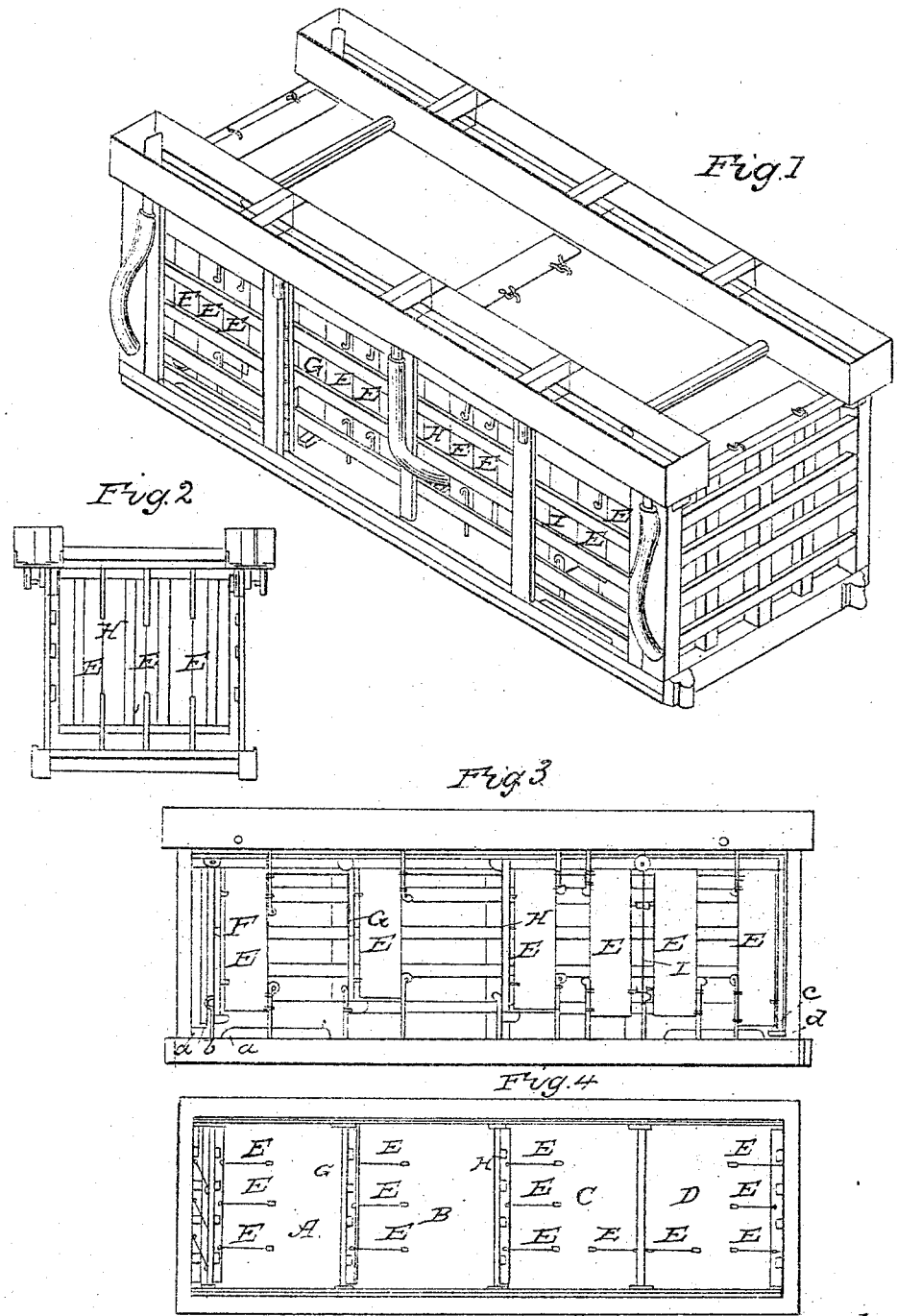

HUGH LEE, OF BELOIT, WISCONSIN.

Letters Patent No. 90,856, dated June 1, 1869

IMPROVED RAILWAY STOCK-CAR.

The Schedule referred to in these Letters Patent and making part of the same.

*To all whom it may concern:*

Be it known that I HUGH LEE, of Beloit, Rock county, in the State of Wisconsin, have invented certain new and useful Improvements in the Construction and Manufacture of Railroad-Car Boxes for the Conveyance of Cattle, Horses, or other Animals, or freight or merchandise; and I do hereby declare the following description and accompanying drawings are sufficient to enable any person skilled in the art or science to which it most nearly appertains, to make and use my said invention or improvements without further invention or experiment.

The nature of my invention and improvements consists in the construction and manufacture of railroad-car boxes for the conveyance of cattle, horses, or other animals, or freight or merchandise upon railroads.

The cars are to be subdivided into any available number of compartments, as circumstance may require, so as to accommodate large or small-sized animals, by means of movable partitions.

Each of the compartments, marked A B C D, as shown in the drawings, is to be subdivided into any available number of stalls, according to the size of the animals to be conveyed or transported.

Each stall may be of sufficient size to enable the animal confined therein to lie down or stand up.

The partitions, marked E in the drawings, and subdividing the principal compartments, marked A B C D, into stalls, are so arranged as to stand between the heads and necks of the animals, and also between their hips, if desirable.

The object of the partitions marked E is to prevent the cattle from goring or injuring each other, or the horses from biting or kicking each other, or from getting the food of other animals in the adjoining stalls, and also to confine them in their respective stalls.

The drawings represent a car-box, adapted to a narrow-gauge railroad, and is subdivided into four principal compartments, marked A B C D, by means of movable transverse partitions, marked G H I, with feed or water-troughs and spouts attached to the transverse partitions, marked G H, and also to the end of the car.

In the interior of the car is an extra transverse partition, marked F in the drawings, standing at the end of the car, in the compartment marked A, with feed or water-trough and spouts attached.

Said feed or water-trough is marked *a*, and stands over or above the feed or water-trough marked *a b*, and shows the manner of disposing of said extra transverse partition when it is not required for subdividing the car into five compartments.

All the principal transverse partitions, marked F G H I in the drawings, are moved upon rollers, resting upon the edges of iron bars, which are secured to the sides of the car, in the interior thereof, and near the roof or deck of the car.

The feed or water-troughs attached to the floor and ends of the car, and also those feed or water-troughs attached to the transverse partitions, marked F G H, are so arranged that the animals cannot void dung or urine into them, and so as to keep them clean for the reception of food or water.

The bottom of the feed or water-trough attached to the transverse partition marked G, passes over and just above the top of the trough attached to the transverse partition marked F; also the bottom of the trough attached to the transverse partition marked H passes over and just above the top of the trough attached to the transverse partition marked G.

The bottom of the transverse partition marked I, passes over the top of the trough attached to the floor and end of the car, in the compartment marked D which said trough is marked *c d*.

The partitions marked E, standing between the heads and necks of the animals, or between their hips if desirable, are firmly held in proper position by means of spring or chain-bolts, (all of which are under the control of a person either upon the deck of the car or in the interior thereof,) and are attached to the ends of the car, and to the sides of the transverse partitions marked F G H I, by means of hooks and eyes, as represented in the drawings, and can be swung in either direction, against the ends of the car or against the transverse partitions.

The above-mentioned partitions, marked E, can be readily unshipped from one set of hooks to other sets of hooks provided for that purpose, so as to enlarge or diminish the size of the stalls, according to the size of the animals, as shown in the drawings.

The under edge or bottom of the partitions, marked E, is to swing clear and just above the top of the feed or water-troughs.

A section of the partitions marked E, corresponding in shape to the width and depth of the water-trough, is to pass down into the trough, so as to subdivide the trough into sections.

The object of subdividing the trough into sections is to prevent any animal from getting its neighbor's food.

Water can pass freely into all the subdivisions of the trough, by means of holes in the bottom of each partition subdividing the trough.

The dimensions of the several feed or water-troughs are to be about twelve inches in width by six or eight inches in depth. The shape and dimensions of the troughs to be such as will best accomplish the objects for which they are intended.

The feed or water-troughs, and the spouts for conveying food to the troughs, are to be manufactured either of wood or metal, or both.

The feed or water-troughs are to be attached to the transverse partitions marked F G H, either stationary or by hinges, as shown.

If the trough is attached to the transverse partitions by hinges, it is to be raised, and kept in proper position for feeding or watering, by means of a chain or rope, one end of which is to be attached to the outer edge of the trough, and the other end passing up to the deck of the car, and secured to a hook, or the trough may be kept in proper position by means of bolts passing through the sides of the car, into holes in iron straps, secured to the ends of the trough, as shown in the feed-trough attached to transverse partition marked H. Said bolts are to be drawn or pulled out when the transverse partition is to be moved.

The car is to have four outside doors, situated in the sides and near the ends of the car, as shown.

The deck of the car is to be either level or ovalling, and upon each side of the car-deck, wooden or metallic tanks are to be secured. These tanks are to project three or four inches beyond the sides and ends of the car, as shown in the drawings.

The deck-tanks are to be from twelve to sixteen inches in depth and width. They are to be connected by hollow tubes or boxes, so as to convey water from tank to tank, as shown in the drawings.

The deck-tanks are for the purpose of receiving water from the water-tanks at railroad-stations where it may be desirable to water the animals.

The water in the deck-tanks is to be conveyed to the feed or water-troughs in the interior of the car, by means of gutta-percha, wooden, or metallic tubes, as shown in the drawings.

In the bottom of the deck-tanks horizontal-sliding valves are to be constructed, as shown. By opening the valves, the water is conveyed to all the troughs in the interior of the car at one and the same time.

Each of the feed or water-troughs is to be perforated with a hole in the bottom of the trough, which can be closed or opened by valves or stoppers, so that any surplus water can be drawn off before feeding the animals, or to prevent freezing in the troughs in cold weather, as shown.

Trap-doors are to be constructed in the deck of the car, for the purpose of conveying grain, meal, or cut feed to the animals through the spouts attached to the ends of the car and to the transverse partitions, and also for drawing the spring or chain-bolts which fasten the partitions marked E, or for hauling or moving the transverse partitions marked F G H I.

The dung or excrement can be hauled out of the car through openings in the sides of the car, as shown in the drawings, and the animals can be kept clean and comfortable while in transit upon long journeys, thereby superseding the necessity of unshipping while *en route*.

By opening any of the outside doors, releases one animal, and sets it at liberty. The person upon the deck of the car then draws the spring or chain-bolts of the next adjoining partition, marked E, and swings it back upon its hinges, and thus sets another animal at liberty. By this process all the animals can be unshipped.

The manner of shipping the animals is similar to the method of unshipping them, differing in this respect, viz, that a person in the interior of the car arranges the several stalls and partitions for the reception and confinement of the animals.

By rolling the transverse partitions into the ends of the car, adapts the car for carrying freight or merchandise.

What I claim as my invention and improvement, and desire to secure by Letters Patent, is—

1. The movable transverse portions, subdividing the car-box into compartments, with their attached spouts and feed or water-troughs, substantially as herein set forth and described, for the purpose specified.

2. The movable hinged head, neck, and hip-partitions, subdividing the car or compartments into stalls, according to the size of the animals or gauge of the railroad, and connected to the transverse partitions, and to the ends or sides of the cars, substantially as herein set forth and described.

HUGH LEE.

Witnesses:
O. B. OLMSTED,
S. L. JUDD.